FIG.2

INVENTOR.
VAUGHAN MORRILL JR.
BY Kane, Dalsimer and Kane
ATTORNEY.

INVENTOR.
VAUGHAN MORRILL JR.
BY Kane, Dalsimer and Kane
ATTORNEY.

Sept. 10, 1968 V. MORRILL, JR 3,401,028
APPARATUS FOR FORMING PRECISION GLASS TUBING
FROM A MOLTEN GLASS SUPPLY
Filed Aug. 3, 1964 10 Sheets-Sheet 7

INVENTOR.
VAUGHAN MORRILL JR.
BY Kane, Dalsimer and Kane
ATTORNEY,

Sept. 10, 1968 V. MORRILL, JR 3,401,028
APPARATUS FOR FORMING PRECISION GLASS TUBING
FROM A MOLTEN GLASS SUPPLY
Filed Aug. 3, 1964 10 Sheets-Sheet 9

FIG.16

INVENTOR.
VAUGHAN MORRILL JR.
BY Kane, Dalsimer and Kane
ATTORNEY.

United States Patent Office 3,401,028
Patented Sept. 10, 1968

3,401,028
APPARATUS FOR FORMING PRECISION GLASS TUBING FROM A MOLTEN GLASS SUPPLY
Vaughan Morrill, Jr., Creve Coeur, Mo.
(26 S. Spoede, St. Louis, Mo. 63141)
Filed Aug. 3, 1964, Ser. No. 386,818
4 Claims. (Cl. 65—161)

This invention relates to an improved method and apparatus for continuously forming high-precision tubing from material, such as glass, which is hard at normal atmospheric temperatures and is rendered flowable and workable upon heating, and for controlling the inside and outside dimensions of said tubing within very close tolerances. It relates also to improved tubing made in continuous form by said method and apparatus.

Many attempts have heretofore been made to make high-precision tubing in continuous form. However, these prior processes have been unsatisfactory because of the failure to control the final size of the tubing. Dimensional variations take place between the time the molten glass leaves the tube-forming area and the time that it reaches the point at which its viscosity is high enough to resist further physical changes other than thermal contraction. During this phase of the typical glass tube-forming process, the glass progresses over the tube-forming area in a hot and molten, thick walled, slow-moving tubular mass of relatively large diameter to become a cooler, thinner walled, relatively faster-moving tubular shape of smaller diameter, incapable of further changes that might be caused by mechanical forming processes.

During this period of manufacture in the prior processes, attempts are generally made to control the dimensions of the finished tubing by selecting certain physical dimensions and configurations for the tube forming elements, controlling the temperature and wall thickness in the tube-forming area, controlling rate of withdrawal of molten glass from the tube-forming area, controlling external drafts on the molten tubing and sometimes producing a differential pressure between the inside of the molten glass and the surrounding atmosphere to cause the molten glass to further expand or contract after leaving the tube-forming area.

The difficulties encountered in controlling these various parameters during continuous glass tube-forming processes are well known to those skilled in the art, and under the best of circumstances, result in tubing with diametrical variations of the order of 5% or more.

It is a prime object of my present invention to overcome the difficulties and disadvantages heretofore encountered and to provide an improved method and apparatus for continuously producing high-precision tubing with uniform dimensions held to diametrical variations of less than 0.5% and preferably of the order of 0.1% or less.

Further objects include the provision of an improved method and apparatus of the above character which are relatively simple and inexpensive, and can be readily operated to produce tubing of an improved character.

In carrying out my invention, I have found that I can readily produce, in continuous form, high-precision glass tubing, while the molten glass is subjected to the variable parameters indicated above. In achieving this result, I first heat the glass or other material to flowable and workable condition and thereafter form the material into a continuous tube. The tube of flowable material is externally drawn away from the tube-forming area, thereby cooling it and reducing its diameter as in the prior methods described above. However, as the tubing is drawn, dimensional characteristics of the tubing material are effected by a device in the tube's interior between the tube-forming area and the area where the tube has cooled sufficiently to assume a fixed configuration. This device controls directly the internal dimensions of the tubing being formed, holding them to a predetermined value. In addition to this, if variations in the above parameters of a magnitude for which the device cannot compensate directly occur, it functions as the control member of a servo-mechanism which adjusts external variables (such as heat) to return internal dimensions to the predetermined value. This device thus automatically controls the configuration and internal dimensions of the tubing being formed, has no counterpart in the glass tube-forming techniques described above, and makes possible diametrical accuracies of an order unattainable through prior methods.

General description of drawings

The accompanying drawings show one representative form of apparatus embodying my invention.

General structure

The apparatus comprises generally a frame or supporting structure 2 on which are mounted the mechanism for forming the tube and for accurately controlling the tolerances thereof, indicated at 4. The mechanism for forming the tube and for controlling the tolerances thereof includes the cup 35, the conical member 36 and the control member 37. Also mounted on the supporting structure is the tube-drawing mechanism, indicated at 6. The supporting structure also serves to support other portions of the apparatus, the electrical and gas fittings, and the operating motors and drive mechanism.

The supporting frame comprises a pair of vertical uprights mounted on a base 8. Projecting forwardly from the uprights are a plurality of platforms or tables for supporting the tube-forming and tube-drawing mechanism. Thus platforms 10, 12, 14 and 16 support the mechanism for forming the tube and for controlling the tolerances thereof. The platforms 18 and 20 support the tube-drawing mechanism.

Also mounted on the supporting structure are the electric motors for operating the mechanism. Thus, the uprights support a platform 22 on which is mounted an electric motor 23, suitably connected to a source of electric current (not shown) by wires 24. Motor 23 is connected through gear box 25 to drive shaft 26, on which are mounted pulleys 27, 28 and 29 for rotating the tube-forming and tube-drawing mechanism.

Mounted on base 8 is another electric motor 30, suitably connected to a source of electric current (not shown), and connected through gear box 31 to drive shaft 32 having a pulley 33 for driving the tube-drawing mechanism.

Tube-drawing mechanism

The tube-drawing mechanism 6 is shown more particularly in FIGS. 1, 2 and 11 through 15 inclusive. After the glass tube is extruded between the side surface in the opening of the bottom of the cup 35 and the outer surface of the conical member 36 as will be explained in detail, it is drawn downwardly by the tube-drawing mechanism around the control member 37 and onto an area where it cools sufficiently to maintain its configuration. Thus, after the glass tube has traveled downwardly through the cylindrical housing 74 of the mechanism for supporting the cup 35, it passes between the idling guide rollers 125 and thence downwardly through the tube-drawing mechanism. The tube-drawing mechanism is supported for rotational movement upon the platforms 18 and 20 by bearings 126 and 127. The upper part of the tube-drawing mechanism comprises a circular disc 128 having a central opening and a depending tubular collar or housing 129 to which the pulley 130 is secured. The pulley 130 is connected by geared or toothed belt 131 to pulley 29 mounted upon shaft 26 driven by motor 23. Thus, motor 23 through shaft 26 and the interconnecting pulleys and belt causes the rotation of the tube-drawing mechanism.

Figures 5, 12, 14:
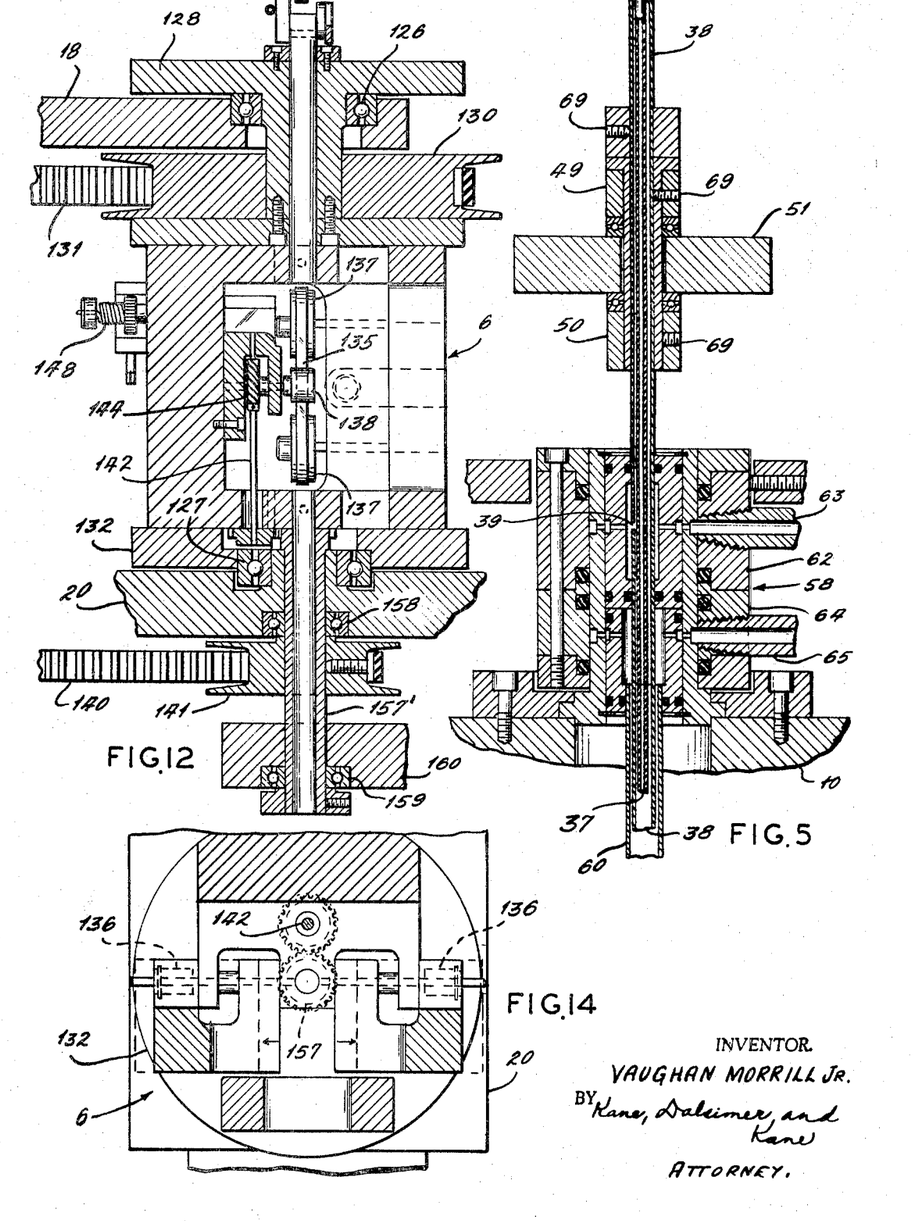
FIG. 5 is a detailed, sectional view in elevation in the direction of the arrows on the line 5—5 of FIG. 2.
FIG. 12 is a detailed, sectional view in elevation through the lower portion of the apparatus at right angles to the view shown in FIG. 11.
FIG. 14 is a transverse, sectional view through the lower portion of the tube-drawing mechanism in the direction of the arrows on the line 14—14 of FIG. 11.
Figure 11:
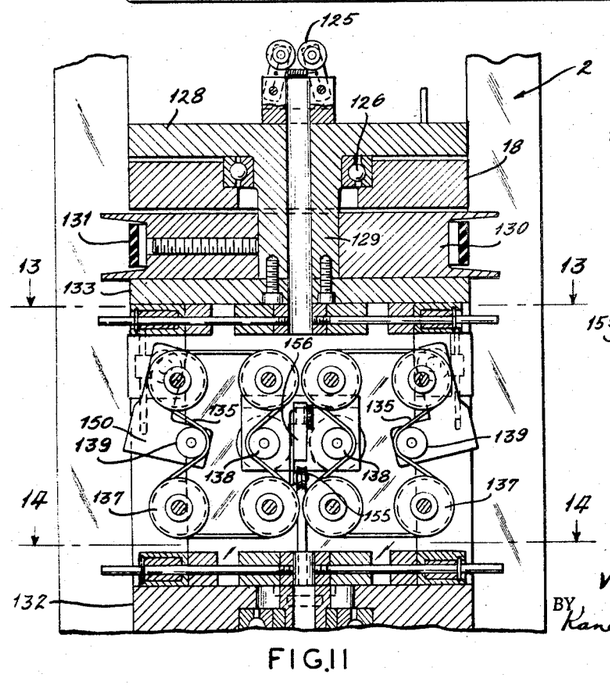
FIG. 11 is a sectional view in elevation through the lower portion of the apparatus in the direction of the arrows on the line 11—11 of FIG. 2.
Figure 15:
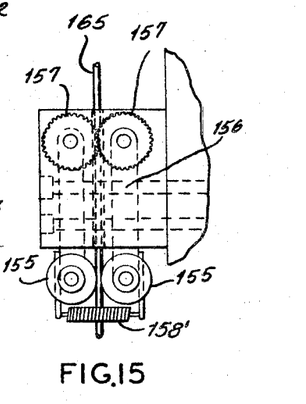
FIG. 15 is a detailed view of the tube-drawing mechanism.

The lower portion of the tube-drawing mechanism is mounted on a rotatable disc 132 supported on platform 20 by means of bearings 127. Between the disc 132 and the disc 133 mounted below the pulley 130 are a pair of shiftable blocks 134 for carrying the tube-drawing belts 135. The supporting blocks 134 are mounted upon the ball-bushing assemblies 136 whereby they are transversely shiftable towards and away from each other.

Each of the belts 135 extend around the guide rollers 137 at the upper and lower ends of the belt assemblies and thence pass around the back surfaces of the belt drive rollers 138 arranged at their confronting faces and around the tension rollers 139 arranged at their remote surfaces.

The belt drive rollers 138 are driven by motor 30 connected through gear box 31 to shaft 32 having pulley 33 mounted thereon. The pulley 33 drives belt 140 which, in turn, drives pulley 141 mounted on shaft 142 so as to cause the rotation thereof. Mounted on shaft 142 is worm 143 which operatively engages worm gears 144 keyed to the shaft which mounts the drive rollers 138. Rotation of the drive rollers 138 drives belts 135. Thus, operation of motor 30 causes operation of the belts 135. The speed of the belts may be controlled through the speed control gear box 31.

The supporting blocks 134 and the belts 135 are shiftable towards and way from each other on the ball-bushings 136. They are normally pressed towards each other so as to exert a yielding resilient force upon the glass tube being pulled therethrough by means of the helical springs 146 extending between the outer surface of the blocks and the brackets 147 mounted on the disc 132.

The belts 135 are maintained in a relatively taut condition by the tension rollers 139. The tension rollers are normally pressed toward each other so as to exert tension on the belts 135 by means of helical springs 148 disposed around shafts 149 and exerting an outward force or tension upon collars mounted on the outer end of the shafts. The tension rollers 139 are mounted upon pivotal plates 150. The springs 148 serve to shift the shafts 149 outwardly so that the cams 151 mounted at the inner end thereof tend to shift the lower end of the plates 150 inwardly so that the tension rollers 139 exert a tensioning force upon the belts 135.

In order to center the glass tube between the belts 135 as the tubing is rolled downwardly between the belts, idling guide rollers 155 are pivotally mounted at the lower end of the arms 156 which, in turn, are pivotally mounted on the shafts of gears 157. The idling rollers 155 are normally pressed towards each other and in engagement with opposite sides of the glass tubing fed therebetween by means of spring 158' connected between brackets extending downwardly from the arms 156. The idling rollers 155 are disposed at right angles to the rollers 137 and 138, and are positioned adjacent the central portion of belt 135 so as to center the glass tubing between the two sides of the belts 135.

Thus, in making the precision glass tubing, the tube is pulled downwardly between the idling rollers 125 and belts 135 and thence downwardly through the tubular lower portion of the tube-drawing mechanism, shown at 157'. Tubular member 157' is supported for rotary motion by bearing 158 in platform 20 and in bearing 159 in bracket 160 depending from platform 20. The glass tubing may be fed downwardly beneath the tubular outlet 157' to a storage chamber beneath the apparatus where it may be wound into a large ring. The tubing may thereafter be cut to desired lengths for use.

The ratio between pulley 29 and 130 is such as to rotate the tube-drawing mechanism about a vertical axis at the same rate of speed as the cup, conical member and control member, as will be explained in detail. The rate of rotation may be varied.

The rate of draw of the tube-drawing mechanism may be varied in accordance with the size of the tubing which it is desired to produce and with the size of the cup, conical member, and control member.

Mechanism for forming the tube and controlling the tolerances thereof

This mechanism is indicated generally by the numeral 4, and is shown primarily in FIGS. 1 to 10, and 16.

Figure 16:
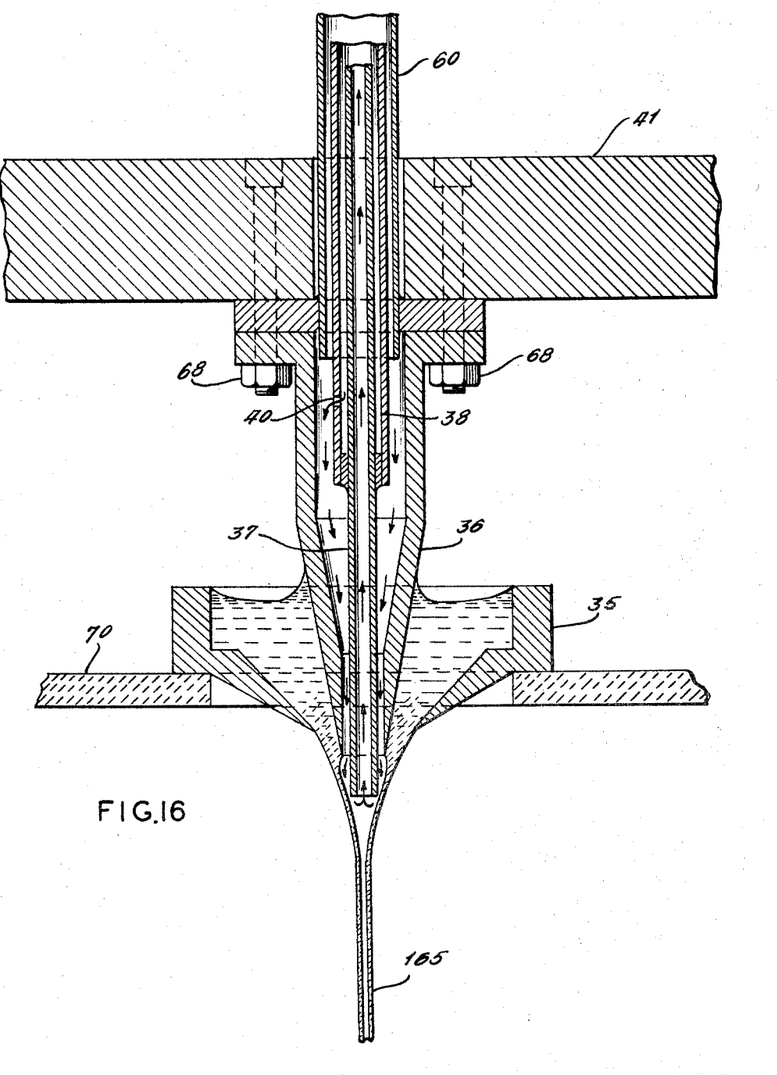
FIG. 16 is a partially schematic, sectional view of the tube-forming portion of the apparatus showing the cup, conical member, control member, and related portions of the apparatus, together with the molten glass being formed into a tube.

It comprises a cup 35, a truncated cone or conical member 36, and a compensator or control member 37. These parts, or at least the operating portions thereof, are made of a material that can withstand high temperatures in excess of the temperature at which the material from which the tube is to be made is rendered flowable and workable. Where the tube is to be made of glass, the material must withstand temperatures in the neighborhood of 2000° F. For this purpose I have employed platinum, but I may also employ other suitable materials, such as molybdenum, rhodium or a refractory material.

The cup is large enough to hold a supply of molten glass, or other suitable material, to be formed into a tube. It may be of generally cylindrical shape, having a bottom and a peripheral side wall. The bottom is open in the center, as shown, and the truncated cone 36 is inserted through the opening in the bottom of the cup in concentric relationship therewith. The inner surface of the cup surrounding the opening is polished and smooth, as is the exterior surface of the cone. The size of the opening and the diameter of the cone may be varied in accordance with the size of the tubing desired.

The cone is hollow or tubular as shown, and the compensator or control member 37 extends downwardly therethrough and projects a short distance beneath the cone. The control member is smaller in diameter than the opening through the cone so that a space exists around the control member through which gas may pass. The diameter of the compensator or control member 37 may vary in accordance with the size of the tubing desired, and also in accordance with other conditions of operation.

As shown most clearly in FIGS. 2, 3, 6 and 16, cone 36 is mounted on the underside of plate 41, which in turn is supported by bracket 42 at the lower end of rotatable, tubular housing 43. The rotatable housing 43, in turn, is mounted in bearings 44 and 45 in the platforms 12 and 14. The upper end of housing 43 is joined to a toothed pulley 46, which is engaged by belt 47 driven from pulley 27. Thus, motor 23 serves to rotate pulley 46, housing 43, and cone 36 secured to the lower end thereof.

The mounting for the cup 35 is most clearly shown in FIGS. 1, 2, 6, 7, 8 and 9. The cup is removably mounted on table 70 by means of set screws 71. Thus, the set screws may be adjusted to position and hold the cup, or they may be loosened to permit the cup to be replaced. The table is supported on legs 72 which, in turn, are mounted on ring plate 73 secured to the upper end of rotatable, cylindrical housing 74. Top plate 73 is provided with an annular trough 75 extending therearound for holding a cooling liquid, such as water. The cooling liquid may be supplied to the upper portion of the trough by means of tube 76 and removed from the lower portion thereof by means of tube 77. Thus, as the tubing is formed and drawn downwardly through the apparatus the table assembly and other components below cup 35 are cooled by the liquid in trough 75.

Figure 6:
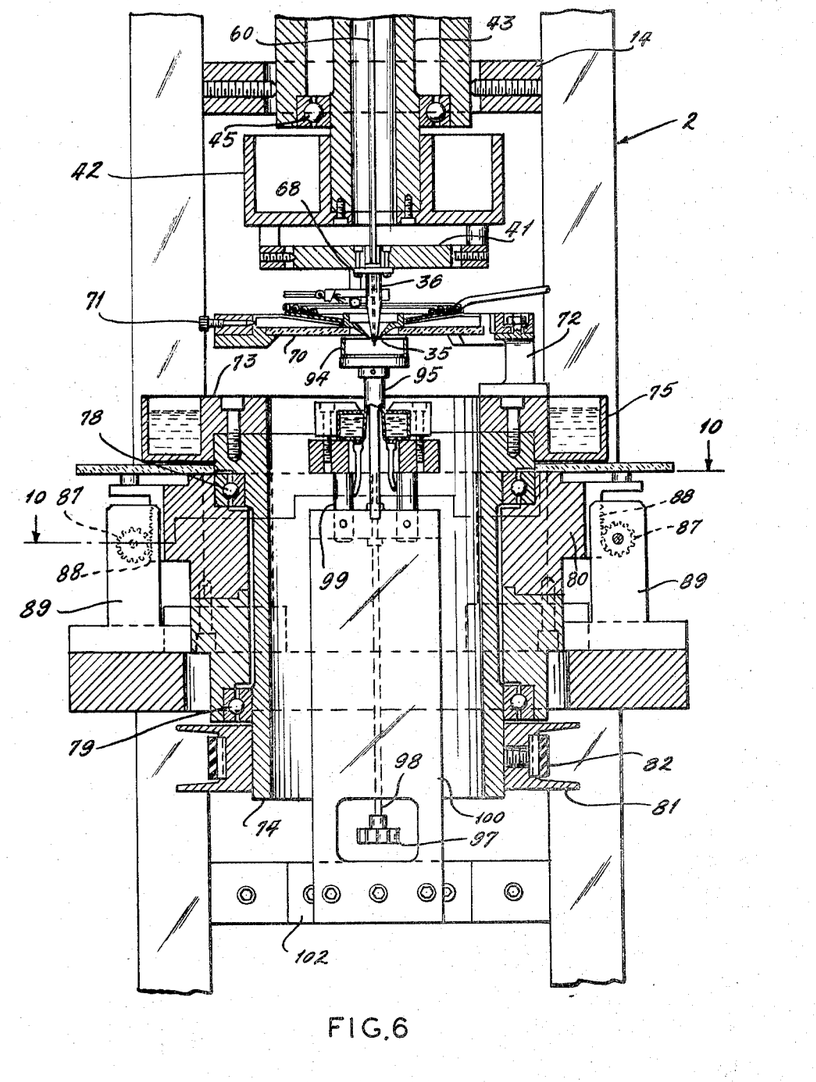
FIG. 6 is a detailed, sectional view of the central portion of the apparatus in the direction of the arrows on the line 6—6 of FIG. 2.

The cylindrical housing 74 is rotatably mounted in bearings 78 and 79, which in turn are supported by the non-rotatable, vertically adjustable mounting jacket 80. The cylindrical housing 74 is joined to pulley 81 at its lower end which is connected by toothed or geared belt 82 to pulley 28 mounted on shaft 26, which is rotated by motor 23. Thus, upon operation of motor 23 the pulley 81 and housing 74 are caused to rotate. Since table 70 and cup 35 are mounted thereon, the cup will likewise rotate. The ratio of pulleys 28 and 81 and of pulleys 27 and 46 are the same with the result that the control member, conical member, and cup will all rotate at the same rate of speed, as will the tube-drawing mechanism. This rotation primarily facilitates the even distribution of tubing material in the cup as explained below, although it may have more complicated effects on tubing configuration.

Figures 17, 18:
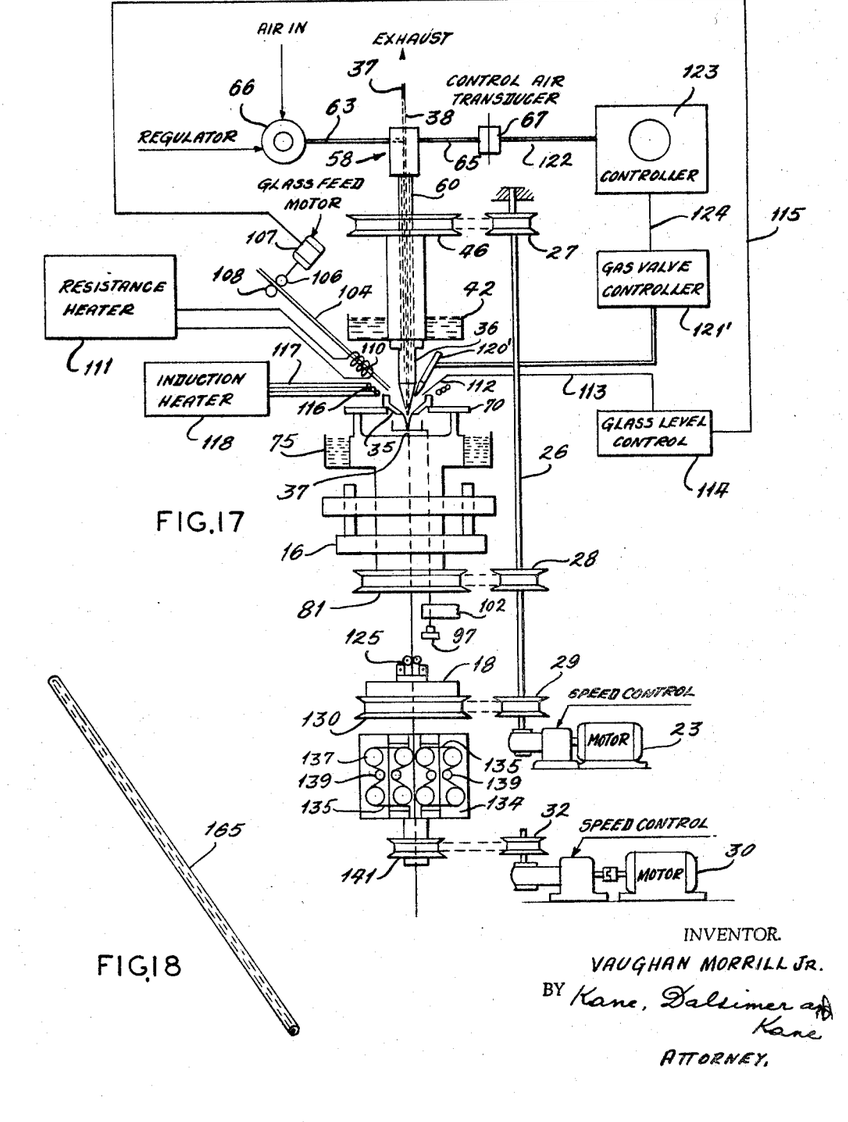
FIG. 17 is a diagrammatic view showing the general layout of the apparatus, together with the principal electrical connections and gas lines.
FIG. 18 is a perspective view of a length of high-precision glass tubing which may be made in accordance with my invention.

The glass or other material to be used in forming the tubing may be supplied to cup 35 in any desired form, such as bead, pellet, powder, premelted stream, or solid rod, and through any suitable mechanism. I have found that satisfactory results are obtained by supplying the glass in solid rod form in the manner indicated in FIG. 2 and diagrammatically in FIG. 17. Thus, a glass rod 104 is fed through a guide sleeve 105 to the cup 35 by means of feed roll 106 rotated by motor 107. A guide pressure roller 108 may be positioned opposite the feed roll 106 and pressed into frictional engagement with the glass rod by spring 109. As the glass rod 104 is fed into cup 35, it may be preheated by a suitable heater, such as the resistance coil 110 disposed around the rod or guide sleeve 105 before it enters the cup, and the preheating burner 120 controlled by valve 121 over the cup itself. The electrical resistance 110 is suitably connected in circuit with a power supply 111 as indicated in FIG. 17.

The rate of feed of the glass rod 104 into the cup may be controlled by an electrode of feeler 112 which extends into the upper portion of the cup. When the glass level in the cup reaches the electrode, the speed of motor 107 is decreased so as to decrease the rate of feed of the glass into the cup. Conversely, when the level of glass in the cup drops below the electrode, the rate of feed is increased. This mechanism serves to maintain the level of molten material in the cup. It is indicated diagrammatically in FIG. 17 where the electrode 112 is shown as connected by line 113 to control unit 114, which in turn is connected by line 115 to the electric motor 107 to control the rate of feed in the manner indicated.

Figures 7, 13:
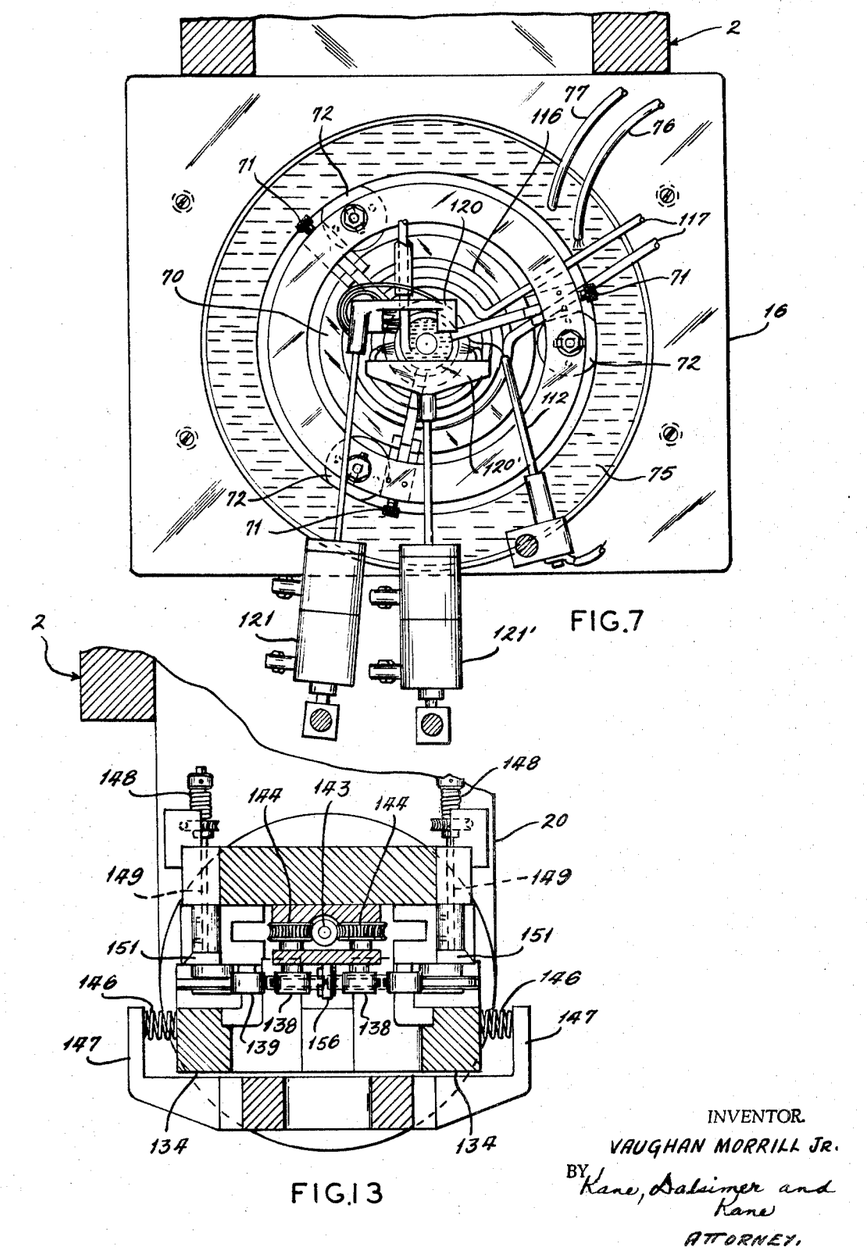
FIG. 7 is a broken, transverse sectional view through the portion of the apparatus where the glass is heated in the direction of the arrows on the line 7—7 of FIG. 2.
FIG. 13 is a transverse, sectional view of the tube-drawing mechanism of the apparatus in the direction of the arrows on the line 13—13 of FIG. 11.
Figure 8:
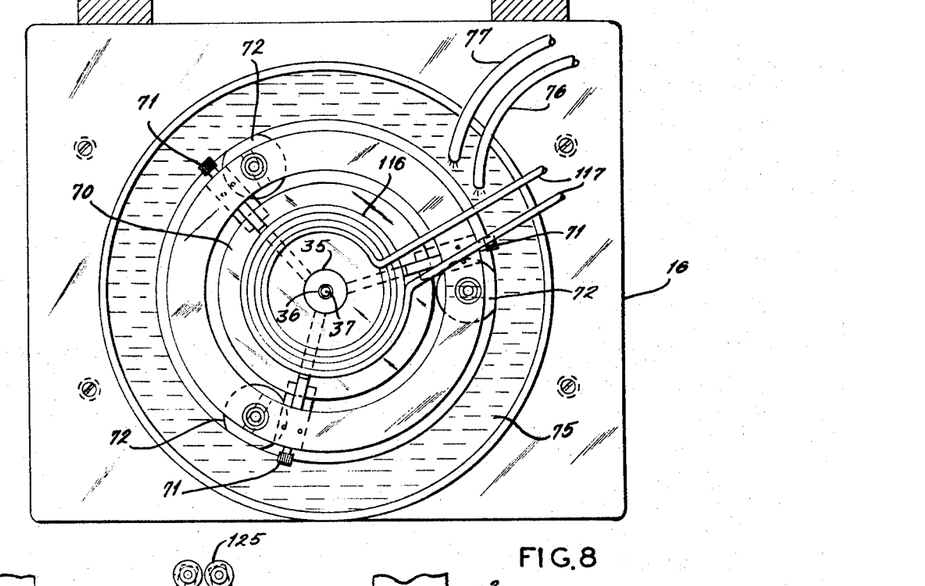
FIG. 8 is a broken, transverse, sectional view of this portion of the apparatus in the direction of the arrows on the line 8—8 of FIG. 2.
Figure 9:
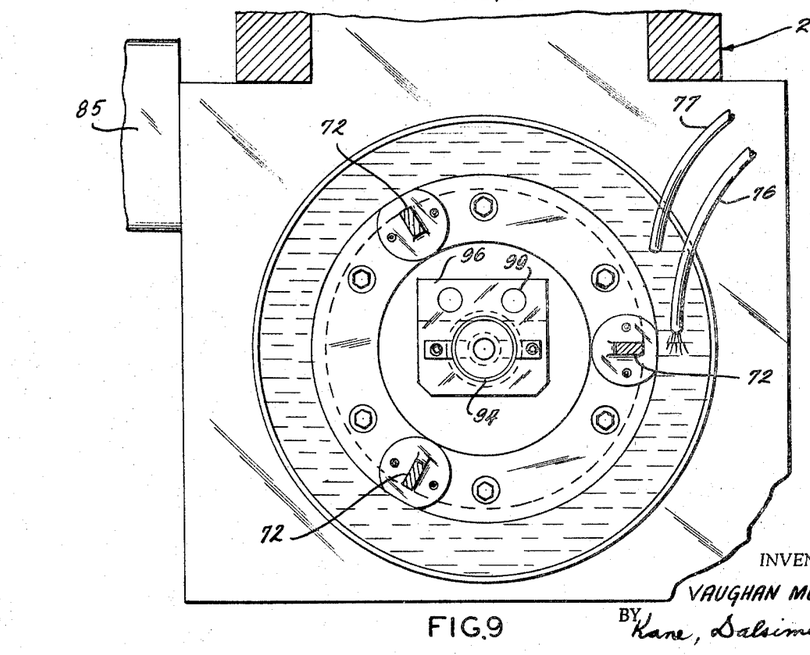
FIG. 9 is a broken, transverse, sectional view showing the portion of the apparatus immediately beneath the tube-forming portion, in the direction of the arrows on the line 9—9 of FIG. 2.

The glass in cup 35 is heated to molten form by two different sources. One of these constitutes a constant heat source and in the illustrated embodiment takes the form of an induction heater of the high-frequency, or radio-frequency, type. Thus, as shown, an induction heating rod or coil 116 is mounted on table 70 surrounding cup 35. The induction heating coil 116 is connected to radio-frequency generator 118, as indicated at 117 in FIG. 17. In addition to the constant heat source, I provide a variable and controlled heat source in the form of gas jets, although radiant heating, induction heating, resistance heating, or other suitable sources may be used as for the constant source. Thus, as shown in FIGS. 7 and 17, a gas jet or burner 120' is controlled by valve 121', which in turn is suitably connected to a source of fuel gas and of oxygen (not shown). The rate of flow of the gas through the valve and burner and accordingly the heat of the gas flames is automatically varied in response to variations in pressure of the gas in the space between the conical member and the control member, as will be explained.

The molten glass in cup 35 flows downwardly through the opening in the bottom of the cup and between the side surfaces of the opening and the outside surface of the conical member, thus being formed into tubular configuration. The tubular molten glass is thence drawn downwardly by the tube-drawing mechanism.

Cup 35 is mounted so that it can be adjusted upwardly and downwardly with respect to conical member 36. In this way, I control the amount of projection of the conical member beneath the cup, the relative diameter of the portion of the conical member disposed in the opening in the cup, and also the relative width of the space between the conical member and the opening in the cup. This width, of course, is directly related to the wall thickness of the finished tubing.

Figure 10:
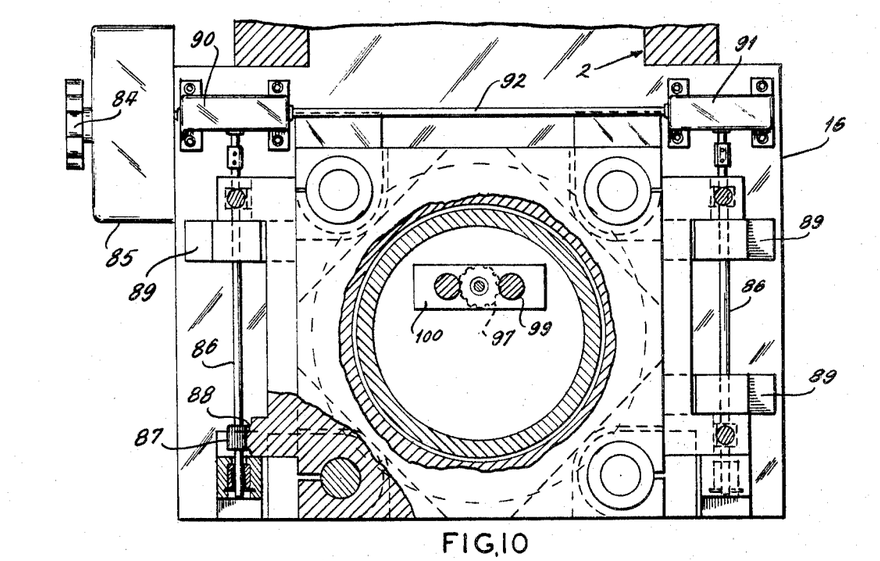
FIG. 10 is a broken, transverse, sectional view through the supporting table used for supporting the cup for holding the glass in the direction of the arrows on the line 10—10 of FIG. 6.

The supporting jacket 80 may be vertically adjusted to raise and lower cup 35 by means of handle 84. Keyed to the end of a shaft extending from gear box 85, rotation of handle 84 causes rotation of shafts 86 having pinions 87 mounted thereon and which engage the racks 88 connected to the jacket mounting assembly 80. Thus, rotation of handle 84 in one direction raises the cup 35 and rotation of the handle in the opposite direction lowers the cup. (The shafts 86 are rotatably supported in uprights 89, as shown in FIG. 10. The one shaft is driven from gear box 90 connected directly to gear box 85. The other shaft is driven from gear box 91 which in turn is connected to gear box 90 by shaft 92.)

It should be noted that conical member 36 is removably mounted on bracket 41 by nuts and bolts 68. Thus, the conical member 36 may be removed and replaced by a different conical member having different characteristics or of different size. The control member and compensator assembly 37 is removably mounted in bearing assembly 49–50 by means of set screws 69. Thus the control member assembly may also be removed and replaced by a control member having different characteristics or of different size.

In order to protect the molten glass tubing from drafts and air currents until it is drawn downwardly to the point where it is cooled and hardened sufficiently to maintain its configuration, I provide a protecting shield or casing around the tubing as it is drawn from the lower end of the cup, conical member and control member into the cylindrical housing 74. This takes the form of shield 94 made of transparent material, such as glass, mounted at the upper end of a cylindrical tube 95 extending downwardly into the housing 74. The shield and tube assembly are mounted on a slide 96 which may be vertically adjusted so that the assembly is lowered into the upper portion of the housing or so that it is raised upwardly with the top surface of the cup almost in engagement with table 70, as shown in FIG. 6. (The shield cannot be raised until it engages the table since it does not rotate.)

The slide 96, the shield 94, and the tube 95 may be elevated and lowered by means of handle 97 mounted at the end of threaded shaft 98, which, in turn, has threaded engagement with the slide 96. Thus, when the handle 97 is rotated in one direction, the slide, shield, and casing assembly are elevated, and when the handle is rotated in the opposite direction, the assembly is lowered. The shifting of the slide upwardly and downwardly is guided by the two guide rods 99 mounted on the upper end of upright 100, which in turn is mounted on shelf 102 supported by the frame members 2.

The compensator or control member 37, together with its surrounding sleeve 38, extend upwardly beyond the top of the supporting structure 2 and are mounted in sleeve bearings 49 and 50, carried by slide member 51. The slide 51 is mounted in brackets 52 so that it may be raised or lowered therein by means of control handle 53 mounted at the end of threaded adjusting member 54. The adjusting member extends through the top of the bracket 52 and engages slide 51 to shift it upwardly and downwardly when the handle is rotated. Thus, the control member may be shifted downwardly to project beyond the end of the cone or may be elevated to be withdrawn within the cone.

Indicator gauge 55 mounted on the slide 51 shifts upwardly and downwardly therewith and has an operating plunger 56 which engages the top platform 10 of the supporting structure to indicate the relative position of the control member. Thus, the indicator dial may be calibrated in thousandths of an inch to indicate the length of the portion of the compensator projecting below the cone.

Figure 1:
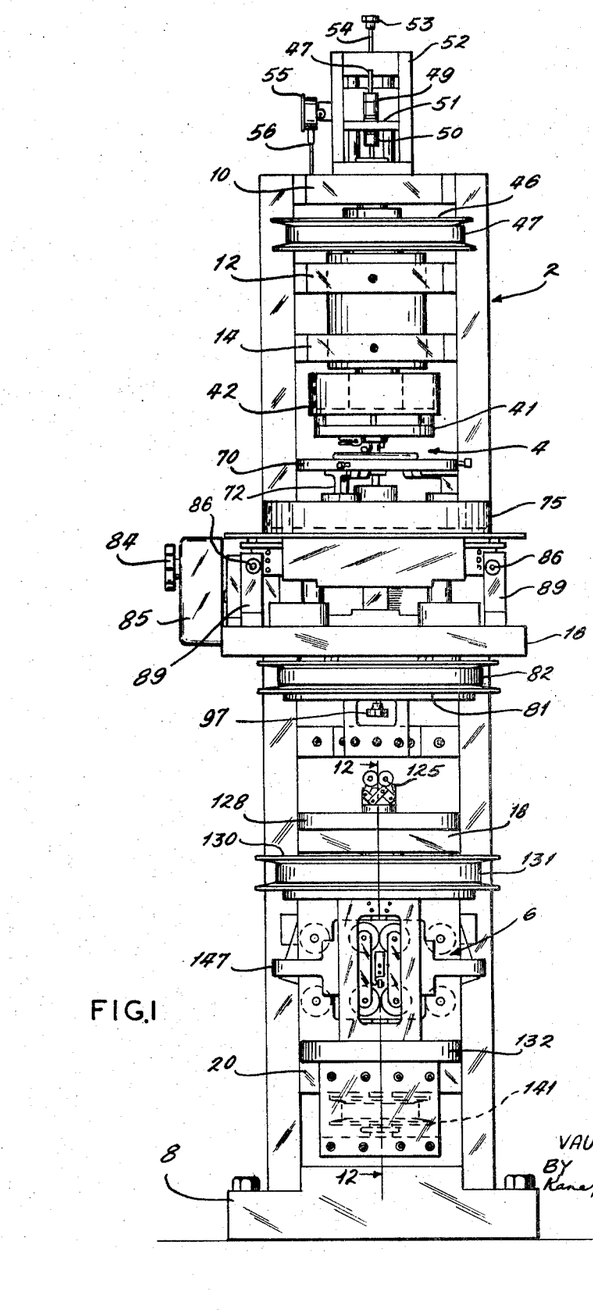
FIG. 1 is a front, elevational view of an apparatus for forming high-precision tubing.
Figure 2:
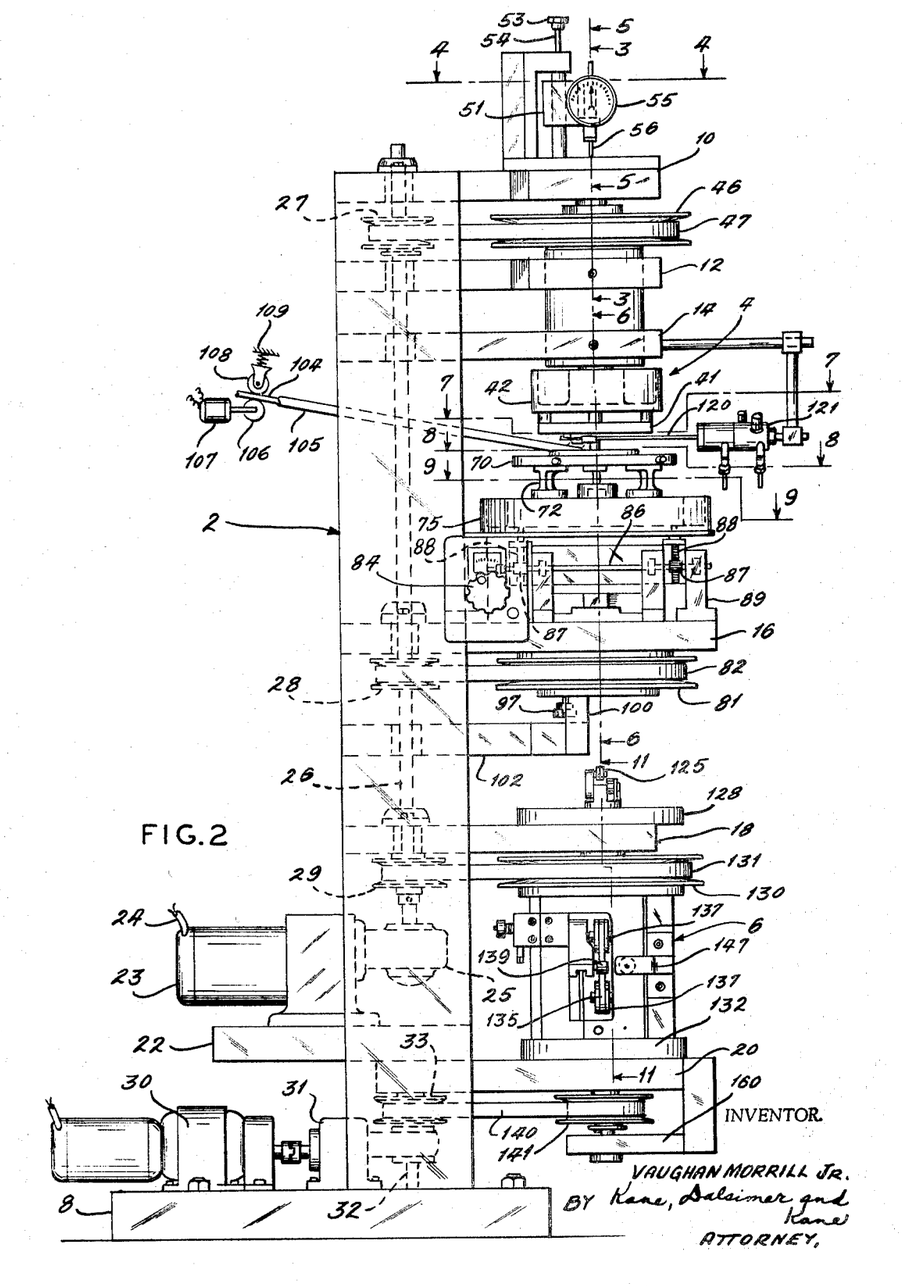
FIG. 2 is a side, elevational view of the apparatus.
Figure 3:
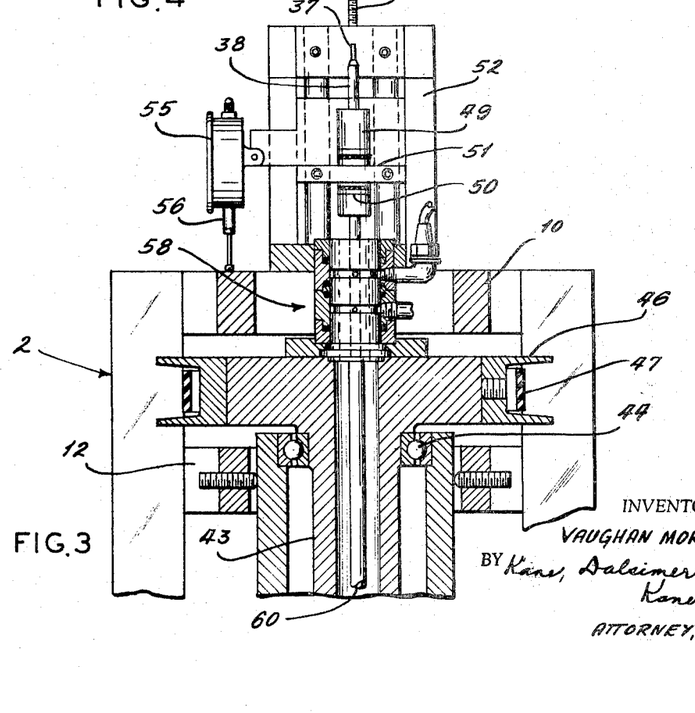
FIG. 3 is a detailed, sectional, elevational view through the upper part of the apparatus in the direction of the arrows on the line 3—3 of FIG. 2.
Figure 4:
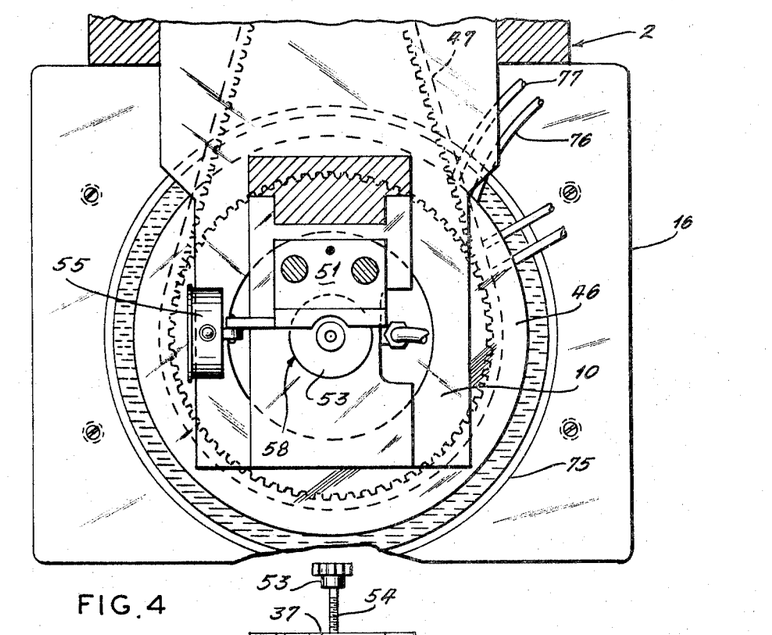
FIG. 4 is a top-plan view with portions omitted and in section, in the direction of the arrows on the line 4—4 of FIG. 2.

As shown in FIGS. 3, 5 and 6, the compensator or control member 37 and surrounding sleeve 38 project downwardly through platforms 10, 12 and 14 into conical member 36. Under normal conditions of operation, the control member projects below the conical member in concentric relationship therewith.

The compensator or control member 37 is hollow so that a gas, such as air, may escape therethrough. The control member is provided with a concentric tubular sleeve 38 which terminates short of the lower end. The sleeve 38 is sealed to the control member at its upper end and lower end, as shown, has an inlet opening 39 in an intermediate portion, and an outlet opening 40 near its lower end. Air or other gas is introduced into the sleeve through the opening 39 and exits through the opening 40. In this connection, the exit opening 40 is a metering opening which allows the flow of gas outwardly therethrough at a small accurately controlled rate.

A tubular casing 60 surrounds the control member assembly and extends from the sleeve coupling assembly 58 downwardly to the conical member 36. At its lower end, the casing 60 has a sealing fit with the conical member and at its upper end, a sealing engagement with the sleeve-coupling assembly 58. Through this assembly gas may be introduced into the sleeve 38 and the gas pressure in the space surrounding the sleeve may be sensed, as will be explained.

It will be seen that the sleeve coupling assembly includes two sleeve couplings, disposed one above the other. Thus, the upper sleeve coupling has a stationary collar 62 through which the gas line 63 extends. The gas line communicates with ports in the rotary portion of the coupling, which in turn supply the gas to a chamber surrounding the portion of the sleeve 38 in which the aperture 39 is located. Thus, gas from the line 63 can enter through aperture 39 inside the sleeve 38. The lower sleeve coupling has a stationary collar 64 through which line 65 extends. The line communicates with ports in the coupling sleeve which, in turn, connect with a chamber communicating with the inside of casing 60 through the open upper end thereof. Thus, the pressure inside casing 60 can be continuously sensed through line 65.

As shown in the diagrammatic FIG. 17, the gas line 63 connects through a pressure regulator 66 to a suitable source of gas under pressure, such as air, argon, nitrogen, or the like. I have found that satisfactory results are obtained in supplying an inert gas such as argon under a pressure of 15 lbs. per square inch.

It can be seen that the gas may be forced through aperture 39 into the sleeve 38. The pressure of the gas builds up inside the sleeve and it is metered out through aperture 40 to the space between the control member and the conical member. Since the lower end of casing 60 is sealed to the upper end of the conical member, the gas pressure inside the casing 60 will be the same as the gas pressure inside the conical member. This gas pressure, which I shall term compensator pressure, not only acts as a bearing which prevents the tubing from engaging the control member, but also continuously controls the bore of the tubing being formed.

Compensator function and precision control

The pressure of the gas in the space between the conical member and the control member, or in what may be termed the compensator chamber, varies in accordance with variations in the plasticity of the tubing material and/or the inner diameter of the tube surrounding the lower extremity of the control member. It will be recalled that gas from pressure regulator 66 passes through line 63 through aperture 39 inside of tubular sleeve 38 surrounding the control member and through meter hole 40 into the compensator chamber. To escape the compensator chamber, the gas must pass between the outer surface of the lower extremity of the control member and the molten material flowing through the annular opening formed by the cup and the cone as shown in FIG. 17. Having passed through the annular space between the molten tube material and lower extremity of the control member, the gas escapes upwardly through the hollow interior of the control member, and some may escape downwardly through the length of the tubing being formed. Thus, gas enters the compensator chamber at a constant and controlled rate, and escapes through an opening whose size depends upon the outside diameter of the lowest extremity of the control member and the inside diameter of the tubular material flowing between the cup opening and the cone.

As we have seen, the inner diameter of cup-and-cone formed glass tubing varies with many external parameters, such as the level of molten glass in the cup, the rate at which cooled tubing is being drawn from the tube-forming area, the size of the opening between the cup and the cone, the temperature of the cup, molten material, atmosphere, etc. Indeed, the internal diameter of the molten material at the level of the lowest extremity of the control member varies with these parameters also, and in direct proportion to the variance in the finished tubing. Since the pressure in the compensator chamber is determined primarily by the rate at which gas enters and the rate at which it escapes, and since the rate at which it enters is being held constant, it is clear that the size of the annular opening through which the gas is escaping will be inversely related to the compensator pressure.

Because the compensator pressure is always high enough to prevent the plastic tubing material from contacting and engaging the control member, it is evident that when the above-mentioned parameters are held constant, the compensator pressure will remain constant, as will the bore of the finished tubing. In practice, it is extremely difficult to hold all of these parameters constant, and when one or more of them are changing, changes in the compensator pressure occur which tend both directly and indirectly to maintain the bore or inner diameter of the tubing being formed.

When a minor change in any parameter occurs which decreases the size of the annular opening between the molten tubing material and the lower extremity of the control member, the passage of gas through this opening is constricted and the compensator pressure increases as explained above. This increase in compensator pressure forces the molten material away from the lower extremity of the control member, tending to restore or maintain the distance between the tubing material and the lower extremity of the control member, and subsequently tending to restore or maintain the bore of the finished tubing. Contrariwise, when a minor change in any parameter occurs which increases the size of the annular opening between the molten tubing material and the lower extremity of the control member, the compensator pressure decreases, allowing the tubing material to move closer to the lower extremity of the control member, due to forces of surface tension and external pressure. Thus do changes in the compensator pressure tend directly to maintain the bore or inner diameter of the tubing being formed.

When major changes in the temperature of the tubing material occur, the situation is somewhat more complicated. Temperature changes affect the plasticity of the tubing not only around the lower extremity of the control member, but also through a length of tubing below the control member and above the tube-drawing mechanism in which the configuration of the tubing has not yet fixed or frozen. When the tubing material is hotter and therefore more plastic as it passes over the control member, it takes longer to cool or freeze and is subsequently drawn to a smaller diameter by the tube-drawing mechanism. Conversely, when the tubing material is cooler and therefore less plastic, it requires less time to cool or freeze and is not drawn to so small a diameter by the tube-drawing mechanism. To compensate for large temperature changes which have a measurable effect on the point at which the tubing freezes and therefore the bore of the finished tubing, or to compensate for large changes in any parameter which effect the bore of the finished tubing, the pressure in the compensator chamber is sensed and used to regulate the variable heat source.

It will be recalled that the upper extremity of the space between housing 60 and sleeve 38 communicates through line 65 with transducer 67, which is of the diaphragm type and responds to changes in pressure. The transducer 67 is connected by line 122 to controller 123 which may be in the form of a detector and amplifier. The controller is, in turn, connected as shown at 124 to the valve controller 121. Via this servo-mechanism, as the plasticity of the glass in the relatively molten material surrounding the control member increases and the compensator pressure subsequently decreases, the transducer and controller cause the gas valve of the control burner 120' to close and subsequently decrease the heating of the glass tubing material in cup 35, and as the plasticity of the glass surrounding the control member decreases and the compensator pressure increases, the transducer and controller cause the gas valve of the control burner 120' to open and subsequently increase the heating of the cup 35. Thus, through an automatic system do changes in the compensataor pressure tend to maintain the all important parameter of temperature in the tube-forming area, or to compensate for large changes in other relevant parameters, and indirectly to maintain the bore of inner diameter of the tubing being formed.

Operation

The operation of the apparatus and method will now be described in terms of a specific example wherein capillary tubing is produced from flint glass and has an inside diameter of approximately .0350" and an outside diameter of approximately .0480".

A cup 35 having a circular bottom opening of .450" in diameter and made of platinum is mounted in the machine. The cone 36 is similarly made of platinum and has an opening at its lower end of .160" in diameter and a ten degree taper. The cone is projected approximately .060" below the cup and the diameter of the cone at the point of registry with the opening in the cup is approximately .182" with the result that the width of the annular opening between the cup and cone is .134".

The compensator or control member 37 is likewise made of platinum and has an outside diameter of .075" and an inside diameter of .063". It is projected approximately .200" beyond the lower end of the cone, or until the exact bore of .0350 is generated in the finished tubing.

Argon gas is flowed through the tube 63 and aperture 39 into the sleeve 38 surrounding the control member at a rate of approximately 125 cc. per minute at 15 lbs. per square inch pressure. Rods of flint glass are fed into the cup and the glass is preheated and then heated to molten condition in the cup at a temperature of approximately 1,850° F. To accomplish this, the induction heating input to the induction heating coil is at the rate of approximately 2,000 watts of radio frequency energy, and the gas flow rate to the control burners is approximately 230 cc. per minute at 1¼ lbs. per square inch pressure, with the oxygen flow to the burners at the rate of approximately 50 cc. per minute at 4 lbs. per square inch.

The metering aperture 40 near the lower end of the compensator sleeve 38 is approximately .006" in diameter.

In initiating the operation of the machine, the control member is first withdrawn upwardly by rotating the handle 53 until the control member is completely withdrawn inside the conical member 36. The glass rod, immediately after being preheated in the resistance heater and by the preheater burner 120, is gradually fed into the cup, which is heated to the indicated temperature. This procedure takes about half an hour. When the glass becomes molten, it flows downwardly between the surface surrounding the opening in the bottom of the cup and the conical member. A finished piece of tubing is backed upwardly through the tube-drawing mechanism to engage this relatively molten glass. The glass tubing can thus be drawn downwardly through the cylindrical housing 74 which supports the table 70 on which cup 35 is mounted.

In the initial drawing of the glass tubing through the machine, the protective shield 94 and tube 95 may be lowered by rotating handle 97 and after the glass tubing is properly fed through the machine, the shield 94 and tube 95 may be raised upwardly to the position shown in FIG. 6.

After passing through tubular housing 74, the glass tubing is drawn downwardly through guide rollers 125 and the tube-drawing mechanism shown generally at 6. The tubing is then fed outwardly through the sleeve 157' and down to a chamber beneath the apparatus (not shown) where it winds into a coil or is cut to the lengths desired.

When the glass in cup 35 has been heated to the proper temperature of approximately 1,850° F. and is being withdrawn in tubular form at approximately 6' per minute, the control member is slowly lowered by means of handle 53 and projected outwardly beneath the lower end of the conical member approximately .200". In this operation the control member must be slowly and carefully lowered so that it does not engage the molten glass stream. During the initial process, the heating may be accomplished by the preheating of the glass rod and by the induction heating of the glass in the cup. At the time that the control member is lowered into its operating position, the gas control burners 120′ are turned on.

At first the control burners are operated manually. When the gas pressure in the space between the control member and the conical member builds up to approximately ½ lb. per square inch, however, the servo mechanism can be put into operation. Under automatic control, when the pressure in the compensator chamber increases as a result of the decrease in the plasticity of the glass in the zone surrounding the control member, the controller causes the gas valve to open further to increase the heating of the glass in the cup 35. When the pressure of the gas in the space decreases as a result of an increase in the plasticity of the glass in the zone surrounding the control member, then the transducer and controller cause the gas valve to close further so as to decrease the heating of the glass in the cup 35.

Thus, a temperature-related condition of the glass tubing in a zone surrounding the control member is continuously sensed and the information is fed back so as to automatically increase and decrease the heating of the glass in cup 35 in inverse relationship to the temperature of the glass in the zone being sensed.

This results in the production of continuous, fine-bore capillary tubing in which the bore is of uniform diameter and is maintained within tolerances of 0.1% or less. Capillary tubing of this type is illustrated at 165 in FIG. 18.

In the specific example described above, I have found that satisfactory results are obtained if the entire assembly of cup, conical member, control member, and tube-drawing mechanism are uniformly rotated about their vertical axes at approximately two revolutions per minute.

Modifications in the apparatus embodying invention

The apparatus described and illustrated in this disclosure is but a representative form of the method and apparatus which comprise my invention. The alterations or modifications of this method and apparatus anticipated below explicitly do not comprise separate invention.

(a) While the apparatus I have illustrated and described forms precision glass tubing from molten glass, any suitable material may be employed.

(b) While the apparatus I have illustrated and described is involved in the manufacture of small bore tubing, tubing of any bore and of any wall thickness may be manufactured through the method and apparatus of my invention.

(c) While the apparatus I have illustrated and described employs a vertical tube-forming and tube-drawing system in which the tubing is drawn downwardly, the control member and other apparatus of my invention may be employed in systems in which the tubing is drawn horizontally, upwardly or in any direction and attitude.

(d) While the apparatus I have illustrated and described employs an optional and variable rotation system by means of which the tube-forming and tube-drawing mechanisms may be rotated, an apparatus in which these mechanisms, or any part thereof (such as the control member), cannot be rotated may be employed.

(e) While the apparatus I have illustrated and described employs a hollow control member to facilitate the escape of compensator gas, a solid control member may be employed and all compensator gas allowed to exhaust through the bore of the tubing being formed.

(f) While the apparatus I have illustrated and described employs a cylindrical control member, a circular hole in the cup, a conical member, and annular openings between the cup and cone and between the molten tubing material and the control member, any suitable configuration may be employed in any of these areas to facilitate the manufacture of any non-circular configuration of tubing.

(g) While the apparatus I have illustrated and described employs variation in the projection of the control member beyond the lower extremity of the cup or cone (or projection of the cone through and beyond the cup) to effect changes in the average or normal bore of the finished tubing, different average or normal compensator pressures may be employed for this purpose.

(h) While the apparatus I have illustrated and described employs variations in the sensing transducer to vary the heat of a gas burner and subsequently control the bore of the finished tubing, such transducer or any device which responds directly to changes in pressure may be employed in varying radiant heating, induction heating, resistance heating, or any variable heat source affecting the bore of the finished tubing. Instead of or in addition to this, such transducer or any device which responds directly to changes in pressure may be employed in controlling the projection of the control member beyond the lower extremity of the cup or cone, for varying the compensator pressure or rate at which gas is introduced into the compensator chamber, for varying the rate at which tubing is withdrawn from the tube-forming area, for varying the depth or pressure of the molten tubing material in the cup, or for varying any parameter which affects the inner diameter or bore of the finished tubing.

(i) While the apparatus I have illustrated and described employs a control member which projects through the conical member to terminate at a point around which the tubing material is still molten, a control member which projects into a zone where the tubing has fixed or frozen may be employed.

(j) While the apparatus I have illustrated and described employs a hollow control member for the purpose of exhausting compensator gas, such a hollow member may be employed for the purpose of introducing such gas between the tubing material and lower extremity of the control member. Moreover, any system in which the passage of gas over a solid internal member is used to form or to regulate the forming of precision tubing shall be considered an embodiment of the method and apparatus of my invention.

As pointed out above, my apparatus and method are useful in the continuous manufacture of high precision tubing from glass and other materials and the dimensions of said tubing can be held within the dimensions of ±0.5%. The continuous manufacture of high precision capillary tubing has presented particular difficulties. My method and apparatus can be employed to make high precision capillary tubing having a bore with a cross-sectional area of less than 0.060 sq. inch and having a substantially uniform cross-sectional area throughout its length held within tolerances of ±0.1%.

Modifications may be made in the illustrated and described embodiment of my invention without departing from the invention as set forth in the accompanying claims.

What is claimed is:

1. Apparatus for forming high-precision tubing from glass and for controlling the bore of said tubing within very close tolerances comprising: a cup for holding the said glass formed with a central opening in the bottom thereof; heating means at said cup for heating the glass therein to flowable and workable condition; forming means including a surface surrounding the opening in the cup and a conical member disposed in the opening for forming the heated glass into a tube as it flows through the opening; a control member extending outwardly from said conical member for use in controlling the bore of the tube to uniform diameter; tube drawing means spaced outwardly from said control member for drawing the tube thus formed outwardly through said opening and over said conical member and control member to reduce its diameter and while it is subjected to cooling action to an area where the tube has cooled sufficiently to maintain its physical configuration, the final dimensions of said tubing depending upon a number of parameters including the temperature to which said material is heated, the rate at which said tubing is drawn outwardly and the distance which said control member projects beyond said cup and conical member; sensing means for continuously sensing temperature-related characteristics of the glass in the tube around a predetermined annular zone surrounding said control member and including a confined space around the control member communicating with the annular zone between the control member and tube, metering means for supplying gas to said space at a uniform rate of flow so that gas from said space flows outwardly through said zone at a rate of flow depending on the width of the zone resulting from the temperature-related plasticity of the glass in the tube around such zone, said flow of gas serving as a bearing for said tubing and also serving to control minor variations in the dimensions of the tubing; pressure measuring means for continuously measuring the gas pressure in said space; and means for feeding back the pressure information thus measured and for controlling one of said parameters in accordance with variations in the pressure of the gas measured in such space.

2. Apparatus for forming high-precision tubing from glass, as set forth in claim 1, which is provided with means for continuously rotating the cup, conical member, control member, and tube feeding means at a uniform rate of speed as the tube is drawn outwardly.

3. Apparatus for forming high-precision tubing from glass, as set forth in claim 1 in which the heating of the glass is increased as the pressure of the gas in the space is increased and the heating of the glass is decreased as the pressure of the gas in the space is decreased.

4. Apparatus for forming high-precision tubing from material which is hard at normal atmospheric temperatures and which is rendered flowable and workable upon heating and for controlling the bore of said tubing within very close tolerances, which comprises: a cup for holding said material formed with a central opening in the bottom thereof; heating means at said cup for heating the material therein to flowable and workable condition; forming means including a smooth tapered surface surrounding the opening in the cup and a conical, tubular member disposed in the opening and projecting outwardly therefrom and having a smooth exterior surface for forming the heated material into a tube as it flows through the opening; a control member extending outwardly from and beyond said conical member and spaced concentrically inwardly therefrom for use in controlling the bore of the tube to uniform diameter; tube drawing means spaced outwardly from said control member for drawing the tube thus formed outwardly through said opening and over said conical member and control member to reduce its diameter and while it is subjected to cooling action to an area where the tube has cooled sufficiently to maintain its physical configuration; and means for controlling minor variations in the dimensions of the tubing, including means for supplying gas under pressure at a metered rate of flow through the conical tubular member to the annular zone surrounding the control member and for withdrawing said gas through the control member to thereby provide an air bearing for said tubing between the end portion of the control member and the tubing.

References Cited

UNITED STATES PATENTS 2,150,017 3/1939 Barnard _______________ 65—29
2,958,160 11/1960 Cooke et al. ________ 65—161

DONALL H. SYLVESTER, *Primary Examiner.*

A. D. KELLOGG, *Assistant Examiner.*